US006611319B2

(12) United States Patent
Wang

(10) Patent No.: US 6,611,319 B2
(45) Date of Patent: Aug. 26, 2003

(54) OPTICAL FLOW SENSOR USING A FAST CORRELATION ALGORITHM

(75) Inventor: Ting-I Wang, Gaithersburg, MD (US)

(73) Assignee: Optical Scientific, Inc., Gaithersburg, MD (US)

( * ) Notice: Subject to any disclaimer, the term of this patent is extended or adjusted under 35 U.S.C. 154(b) by 0 days.

(21) Appl. No.: 10/057,718

(22) Filed: Jan. 29, 2002

(65) Prior Publication Data

US 2002/0145727 A1 Oct. 10, 2002

Related U.S. Application Data

(63) Continuation-in-part of application No. 09/574,322, filed on May 19, 2000, now Pat. No. 6,369,881.

(51) Int. Cl.[7] .......................... G01P 3/36; G01F 1/712; G06F 17/15
(52) U.S. Cl. ....................... 356/28; 73/861.06; 708/422
(58) Field of Search ........................ 356/28; 73/861.06; 708/422

(56) References Cited

U.S. PATENT DOCUMENTS

| | | | | |
|---|---|---|---|---|
| 4,167,330 A | * | 9/1979 | Haville | 356/28 |
| 4,841,780 A | * | 6/1989 | Inada et al. | 73/861.06 |
| 4,912,519 A | * | 3/1990 | Yoshida et al. | 356/28 |
| 5,020,903 A | * | 6/1991 | Sakai et al. | 356/28 |

OTHER PUBLICATIONS

Wind measurements by the temporal cross-correlation of the optical scintillations Ting-i Wang, G.R. Ochs, and R.S. Lawrence; Applied Optics, vol. 20, No. 23 pp. 4073-4081, Dec. 1, 1981.

Finite aperture optical scintillometer for profiling wind and $C_n^2$ G.R. Ochs and Ting-i Wang; Applied Optics, vol. 17, No. 23, Dec. 1, 1978, pp 3774-3778.
Laser wind sensing: the effects of saturation of scintillation G. R. Ochs, S. F. Clifford, and Ting-i Wang; Applied Optics, vol. 15 No. 2, Feb. 1976, pp 403-408.
Optical wind sensing by observing the scintillations of a random scene S. F. Clifford, G.R. Ochs, and T-i Wang; Applied Optics, vol. 14, No. 12 Dec. 1975, pp 2844-2850.
Use of Scintillations to Measure Average Wind Across A Light Beam R.S. Lawrence, G.R. Ochs, and S.F. Clifford; Applied Optics, vol. 11, No. 2, Feb. 1972, pp 239,-268-271.

* cited by examiner

Primary Examiner—Stephen C. Buczinski
(74) Attorney, Agent, or Firm—Charles H. Thomas

(57) ABSTRACT

An optical flow sensor determines the velocity of a moving flow of air or other gas utilizing a plurality of photodetectors spaced apart in a direction parallel to the direction of gas flow. An optical beam is transmitted to the photodetectors across the flowing gas. Scintillations that occur in the flowing gas due to eddies and particulates in the gas are detected in the photodetectors at slightly different times. The output signals of the photodetectors are conditioned, amplified and transformed to digital form. Temporal cross correlation analysis is then performed on the digitized signals in a digital signal processor utilizing a fast correlation algorithm in which the total number of calculations is proportional to 2N, as contrasted with conventional systems in which the number of correlations is proportional to $N^2$. A time differential between signals from the different photodetectors is then calculated electronically. The velocity of gas flow is then determined by dividing the spatial distance of separation between adjacent photodetectors by the time difference at which the same scintillation event is detected by each photodetector.

17 Claims, 9 Drawing Sheets

Fig. 6    C32 based Board Block Diagram

OPTICAL FLOW SENSOR USING A FAST CORRELATION ALGORITHM

The present the invention is a continuation in part of U.S. application Ser. No. 09/574,322, filed May 19, 2000, now U.S. Pat. No. 6,369,881.

BACKGROUND OF THE INVENTION

1. Field of the Invention

The present invention relates to an optical flow sensor which cross correlates digitized signals from a plurality of photodetectors that are separated in a direction parallel to a predetermined direction of gas flow and to a method of determining gas flow velocity in a predetermined direction.

2. Description of the Prior Art

Accurate flow rate measurement represents one of the biggest problems in industrial and environmental monitoring for contaminants in gaseous discharges. The problem of airborne pollution has become so acute that virtually all industries of any size are now monitored for compliance with applicable regulations or laws limiting gaseous discharges. While the determination of the concentration of pollutants, contaminants, noxious gases, and toxic gases in a gas flow has reached a satisfactory level of reliability, monitoring of the rate, and hence the volume of gas flow, has heretofore been rather inaccurate. As a consequence. The determination of the total extent of pollutants emitted from any particular facility has heretofore been uncertain.

Current technologies that estimate flow rate often rely upon a point sensor that intrudes into the path of a flowing gas, for example in the chimney or smoke stack of an industrial processing plant. The estimates for flow rate achieved with such instruments are often inadequate for industrial and environmental applications. One problem is that the intrusion of a sensor head into the flow medium, alters the resulting flow measurements. Furthermore, the flow medium being monitored is often very dirty and corrosive. Direct contact of the sensing head with the flow medium often quickly fouls the sensing head so that maintenance of the sensor is a major problem.

Attempts have been made to devise ultrasonic gaseous flow measuring devices. However, ultrasonic gaseous flow measuring instruments are very expensive and are also rather inaccurate.

Since pollutants and contaminants often provide a distinctive color of conglomerated dust particles to a gaseous discharge, it is sometimes possible to visually monitor chimneys and smokestacks from a distance in order to ascertain a general estimate of rate of gaseous discharge. However, this requires a direct line of sight to the facility involved. Also, some noxious and toxic gases, such as carbon monoxide, are colorless. Moreover, visual observation is not an option at night or in inclement weather. Unfortunately, a monitored industrial facility may limit the volume of its gaseous discharges during the daytime only to increase them at night when the volume of gaseous discharge cannot be observed.

SUMMARY OF THE INVENTION

The present invention adopts an entirely new approach to measurement of the velocity of a gaseous flow. The invention utilizes an optical transmitter and an optical receiver located on opposite sides of a gas flow passageway, such as a chimney or smokestack. A beam of light is transmitted across the gas flow passageway. The receiver includes a plurality of photodetectors longitudinally separated from each other in a direction parallel to the predetermined direction of gas flow through the passageway. Particulate matter and eddies in the flowing gas produce scintillations in the beam of light transmitted across the passageway.

These scintillations are detected by all of the photodetectors on the opposite side of the passageway, but detection does not occur at the same time in each photodetector. Rather, since the particle or eddy that creates the scintillation is traveling downstream in the gas flow, the photodetector located furthest upstream will detect the scintillation earlier in time than a photodetector located further downstream. This physical phenomenon is similar to the moving shadow cast by a bird or a piece of debris being carried along on the wind. Temporal cross correlation analysis is then performed on the digitized signals in a digital signal processor utilizing a fast correlation algorithm in which the total number of calculations is proportional to 2N, as contrasted with conventional systems in which the number of correlations is proportional to $N^2$.

Fast Correlation Algorithm (FCA)

One major challenge of calculating cross correlation of two data strings with N time delays is that conventional cross-correlation techniques need a number of calculations proportional to $N^2$. When N is a large number, these calculations are extremely time consuming. To speed up the calculation of the cross-correlation function, a Fast Correlation Algorithm (FCA) according to the present invention has been developed as follows.

1. For two data strings with N ($=2^n$) data points, i.e., $A_1$, $A_2$, ... $A_N$, and $B_1$, $B_2$, ... $B_N$, the correlation $C_1$ can be calculated as the ensemble average of the product of $A_i$ and $B_{i+1}$, where i=1 ... N−1. This calculation needs a total of N multiplications.
2. By averaging the two adjacent points of both strings to form two new strings each with length N/2. The correlation $C_2$ can be calculated with N/2 multiplications.
3. Averaging the two adjacent points of the previous two strings once again to form another two strings each with length N/4. The correlation $C_4$ can be calculated with N/4 multiplications.
4. Iteratively doing this process n ($=\log_2 N$) times. A total of n strings formed each with the data length of N, N/2, N/4 ... 4, 2, respectively.

From these calculations, the cross correlations $C_1$, $C_2$, $C_4$ ... $C_{N/2}$ can be obtained to retrieve the crosswind. The major advantage of the Fast Correlation Algorithm (FCA) is that the total number of calculations is proportional to 2N instead of $N^2$. This represents a reduction by a factor of N/2 in the number of calculations required for cross correlation. This crucial reduction, especially when N is a large number, allows the presently commercially available two-channel digital-signal-processors (DSP) to be utilized since they are fast enough to process the crosswind retrieval algorithm due to the reduced number of calculations that are required.

In one broad aspect, the present invention may be considered to be an optical flow sensor for measuring gas flow velocity in a predetermined direction of gas flow. The optical flow sensor of the invention is comprised of an optical transmitter, an optical receiver, signal-controlled gain amplifier circuits, analog-to-digital converters, and a digital signal processor. The optical transmitter generates a collimated optical beam across the predetermined direction of gas flow. The optical receiver includes a plurality of receiving lenses all located in optical communication with the optical transmitter and in the path of the optical beam. The receiving lenses are separated from each other in a direction parallel to the predetermined direction of gas flow. A separate optical photodetector is provided for each of the receiving lenses. Each photodetector produces an electronic output that varies in response to scintillations occurring in the optical beam.

A separate signal controlled gain amplifier circuit is coupled to each of the optical photodetectors. A separate analog-to-digital converter is coupled to each of the gain amplifier circuits for separately digitizing outputs from each of the gain amplifier circuits.

A digital signal processor is coupled to receive inputs from all of the gain amplifier circuits. The digital signal processor determines the temporal cross variance of the digitized outputs for scintillation events detected separately by all of the photodetectors. Cross correlation is performed using a logarithmic time delay function based upon an original data string with $N=2^n$ data points. The fast correlation algorithm averages successive data points in pairs to form a new data string having a length half that of the original data string. The fast correlation algorithm averages each two adjacent points of the new data string to form another data string having a length half that of the data string immediately prior thereto and iteratively averages adjacent data points $n=\log_2 N$ times to provide therefrom a path integrated flow rate in the predetermined direction of gas flow. A digital signal processor can thereby be used to provide a path integrated flow rate in the predetermined direction of gas flow. Since the number of calculations required to determine cross correlation is reduced by a factor of $N/2$, compared to conventional cross-correlation techniques, a conventional two-channel digital signal processor can be employed in preferred embodiments of the invention.

Preferably, the optical transmitter includes a single laser diode or an LED (Light-Emitting-Diode) while only two photodetectors are employed in the receiver. Preferably also, the optical transmitter includes a collimating lens having a diameter of about one inch focused on the laser diode or LED, and each of the receiving lenses is about two inches in diameter and is focused on its photodetector. In the preferred embodiment of the invention the collimating lens produces a collimated optical beam.

In another broad aspect, the invention may be considered to be an optical flow sensor for measuring velocity of gas flow in a predetermined gas flow direction. The optical flow sensor is comprised of a transmitter, a receiver, signal-controlled gain amplifiers, analog-to-digital converters, and a digital signal processor. The transmitter includes an optical source and beam-forming optics for producing a collimated beam across the gas flow. The receiver is located in a line-of-sight path with the optical beam. The receiver includes a plural number of focusing receiving lenses. The receiving lenses are spaced apart from each other in a direction parallel to the predetermined gas flow direction. A separate photodetector is provided for each of the receiving lenses. Each photodetector produces an electronic output that varies with scintillation events occurring in the line-of-sight path. Separate signal controlled gain amplifiers are provided for each of the photodetectors. Separate analog-to-digital converters are coupled to each of the photodetectors for converting their outputs from analog to digital signals.

The digital signal processor cross correlates the digitized signals from the photodetectors as a function of time delay between the detection of scintillation events based upon a number of time delays=N using a fast correlation algorithm which is a fast Fourier transform in which the total number of calculations of cross correlation data points is proportional to 2N. This allows a conventional, commercially available digital signal processor to be used in preferred embodiments of the invention to produce a signal indicative of velocity of gas flow in the predetermined gas flow direction.

In still another broad aspect, the invention may be considered to be a method of measuring velocity of gas flow in a predetermined linear direction. The steps of the invention include: transmitting a collimated optical beam across a volume of gas along an optical line-of-sight path intersecting the predetermined linear direction of gas flow and crossing the gas flow; receiving the transmitted optical beam with a plurality of receiving scintillation detectors spatially separated from each other in a direction parallel to the predetermined linear direction; generating a separate output signal from each of the receiving scintillation detectors in response to scintillations occurring in the gas flow; separately amplifying and digitizing each of the output signals; determining the temporal cross correlation of the separate output signals by using a logarithmic time delay function based upon an original data string with $N=2^n$ data points by averaging successive data point in pairs to form a new data string having a length half of the original data string and averaging each two adjacent points of the new data string to form another data string having a length half that of the new data string, and iteratively averaging adjacent data points $n=\log_2 N$ times; and providing a velocity output signal indicative of velocity of gas flow in the predetermined linear direction based upon distance of separation of the receiving scintillation detectors from each other and upon the temporal cross correlation of the separate output signals.

The method of the invention preferably also includes the step of calculating a time averaged mean output magnitude of signals from each of the photodetectors, repetitiously comparing the time averaged mean output magnitude with signal magnitude from each of the photodetectors, generating a series of single bit codes for the signals of each photodetector depending upon signal magnitude relative to the time averaged mean output magnitude, and utilizing the series of single bit codes for each of the photodetectors in the step of determining temporal cross correlation of the separate output signals.

In operation, turbulence eddies pass through the beam and modulate it. This optical scintillation is received by a pair of adjacent detectors located in the receiver unit housing. The sensor computer calculates the temporal cross correlation of the signals received by the pair of receiving optics. The path integrated flow rate is then derived. Determination of the temporal cross correlation can be implemented by a digital signal processor (DSP). To efficiently use a DSP in a binary domain, it is best to use a one-bit correlation technique to obtain the time-delayed covariance function of the detected signals from the two photodetectors. A one-bit correlation technique is adequate for data processing to retrieve the flow rate from the two detected optical scintillation signals. For DSP programing, one-bit operation is much faster than multi-bit operation, and it also needs less memory.

By taking the difference of positive and negative time delays of the covariance function of the scintillation signals received from the two detectors, i.e., $C_d(r,t)=C_X(r,t)-C_X(r,-t)$, all the noises common to both detectors will be removed. The width of the difference covariance function $C_d(r,t)$ is inversely proportional to the path-averaged flow rate. However, the width of the difference covariance function $C_d[r,\log(t)]$ is independent of the path-averaged flow rate if $C_d[r,\log(t)]$ is plotted on a logarithmic scale of time delay. The amplitude of $C_d[r,\log(t)]$ will depend on the signal-to-noise ratio only and it is not a function of flow rate velocity. Therefore the amplitude or the area under the curve $C_d[r,\log(t)]$ can be used as a data quality factor to indicate the level of signal-to-noise (S/N). Larger amplitude or area indicates better S/N. This S/N quantity can be used as a data quality check.

The sensor will provide real-time continuous measurements of the flow rate in field operation. The instrument is insensitive to environmental acoustic and electromagnetic noises. Unlike most of the traditional flow sensors, one major advantage of this technology is that the measured flow rate is independent of both temperature and pressure. Therefore, the measured velocity is a true measurement regardless of the ambient pressure and temperature of the flow medium.

Preferably the series of single bit codes from each of the photodetectors is analyzed to determine peaks in the output signals from each of the photodetectors. This information is used to ascertain the difference in time of detection of identifiable scintillation events by each of the photodetectors.

In the preferred practice of the invention, the signal-to-noise ratio is calculated for the output signals of the photodetectors as a data quality check. Preferably also the output signals of the photodetectors are subjected to threshold screening to improve reliability of the velocity output signals.

The present invention provides an innovative optical system that measures real-time flow rate of a flowing fluid without employing sensors that intrude into the flow media. The present invention also provides a relatively inexpensive and very reliable flow rate measuring system that operates unattended day and night.

It should also be noted that time delay range of covariance function is critical for crosswind retrieval. Measurement of slower speeds of fluid flow requires longer time delays than measurement of faster speeds.

The invention may be described with greater clarity and particularity by reference to the accompanying drawings.

DESCRIPTION OF THE EMBODIMENT AND IMPLEMENTATION OF THE METHOD

Figure 1:
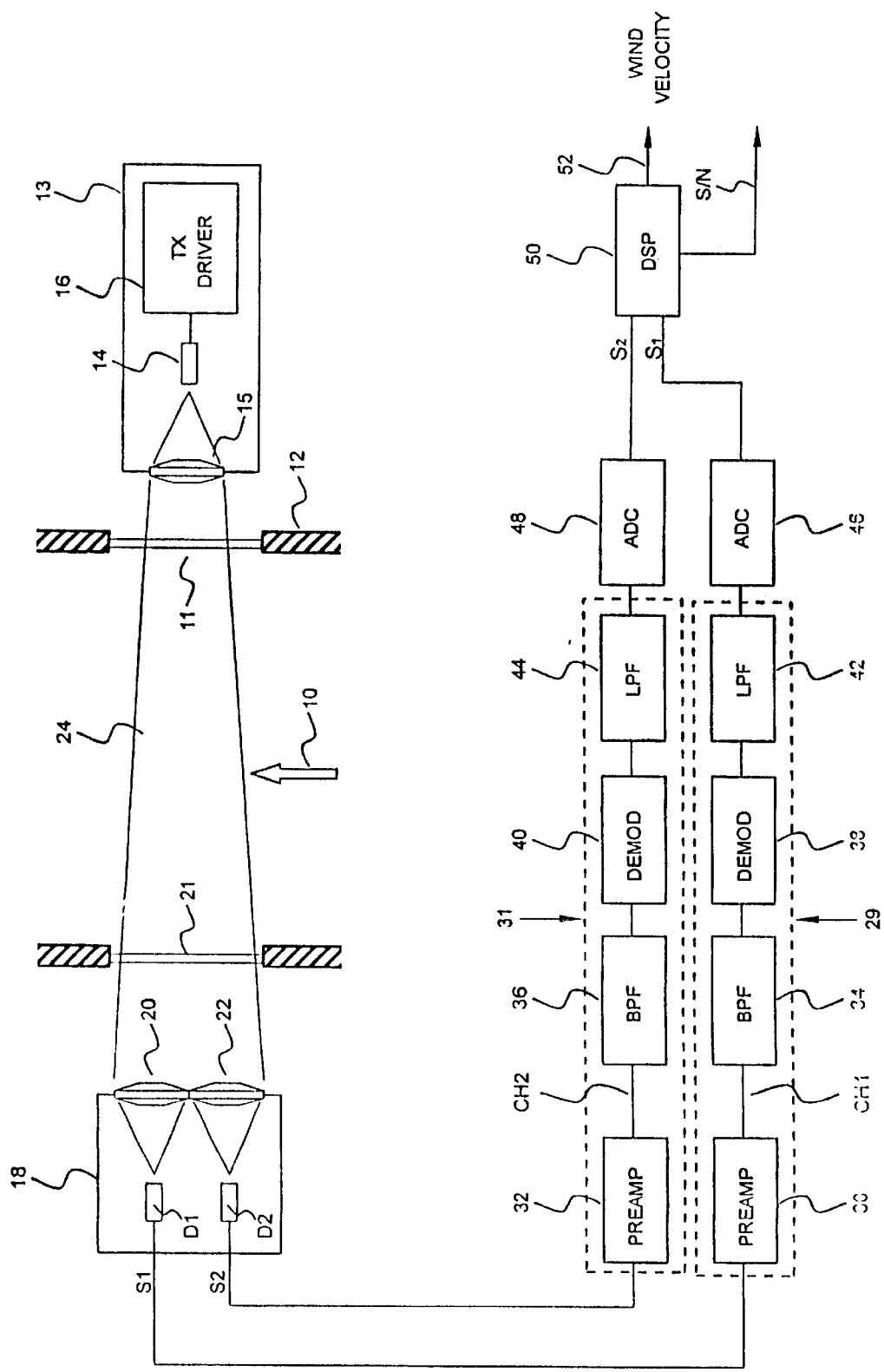
FIG. 1 is a diagrammatic illustration of the major components of a preferred embodiment of the optical flow sensor of the invention.

FIGS. 1–6 illustrate the major equipment components of a preferred embodiment of an optical flow sensor of the present invention as described in prior U.S. application Ser. No. 09/574,322, filed May 19, 2000, which is hereby incorporated by reference in its entirety. FIG. 1 illustrates diagrammatically an optical flow sensor for measuring gas flow velocity in a predetermined linear direction, indicated by the arrow 10 within an elongated, vertically oriented chimney 12 which may, for example, have a diameter of about 10 feet and a length of 30 feet or more. Only a short section of the chimney 12 is shown in FIG. 1.

The optical flow sensor includes a transmitter 13 having a laser diode or an LED 14 located in front of the chimney window 11 and driven by a transmitter driver 16. The transmitter 13 includes an optically transparent collimating lens 15. A receiver 18 is located on the wall of the chimney 12 diametrically opposite the transmitter 13, and includes a pair of receiving lenses 20 and 22 which are in line-of-sight communication with an optical beam 24 produced by the transmitter 13. The beam 24 is directed diametrically across the center of the chimney 12 to intersect the path of gas flow 10.

The beam 24 falls upon both of the lenses 20 and 22. The lenses 20 and 22 are mounted behind the chimney window 21 opposite the lens 15 and are separated from each other in a direction parallel to the predetermined direction of gas flow 10. The distance of separation between the receiving lenses 20 and 22 is preferably greater than the diameter of each of the lenses 20 and 22.

The receiving lenses 20 and 22 are optically focused upon photodetectors D1 and D2, respectively. Each of the photodetectors D1 and D2 produces an electronic output to a separate signal-controlled gain amplifier circuit. The gain amplifier circuit 29 is coupled to the photodetector D1, while the gain amplifier circuit 31 is coupled to the photodetector D2. The transmitter 13, the receiver 18, and the gain amplifier circuits 29 and 31 are quite similar to those described in my prior U.S. Pat. Nos. 4,760,272; 4,754,149; 5,796,105; and 5,838,007, all of which are hereby incorporated by reference in their entireties.

The gain amplifier circuits 29 and 31 include preamplifier circuits 30 and 32, respectively. The preamplifier circuits 30 and 32 are respectively coupled to band pass filter circuits 34 and 36, which in turn are respectively coupled to separate demodulation circuits 38 and 40. Demodulation circuits 38 and 40 are respectively coupled to separate low pass filters 42 and 44, which in turn are respectively coupled to analog-to-digital converter circuits 46 and 48. The analog-to-digital converters 46 and 48 separately digitize outputs from their respective gain amplifier circuits 29 and 31 and pass these digitized outputs as signals S1 and S2 to a digital signal processor 50.

The digital signal processor 50 is coupled to receive inputs from both of the gain amplifier circuits 29 and 31 to determine the temporal cross correlation of the digitized outputs for scintillation events detected separately by both of the photodetectors D1 and D2. The digital signal processor 50 provides a path integrated flow rate in the predetermined direction of gas flow 10 as a wind velocity output signal 52.

The transmitter 13 includes a transmitter driver 16. The transmitter driver 16 provides a modulated signal to the laser diode or LED 14 so that the laser diode 14 generates an optical beam 24 of sufficient intensity to permeate the gas that flows through the chimney 12 along the linear path 10.

The transmitting diode 14 generates the beam 24 while the receiver 18 is located at the other end of the beam 24. Turbulence eddies in the flowing gas pass through the chimney 12 in the direction 10 and through the optical beam 24. These eddies modulate the beam 24 to cause optical scintillation of the signals received by the photodetectors D1 and D2. The modulated light is detected by the photodetectors D1 and D2, which are preferably a pair of identical PIN photo diodes.

Figure 3:
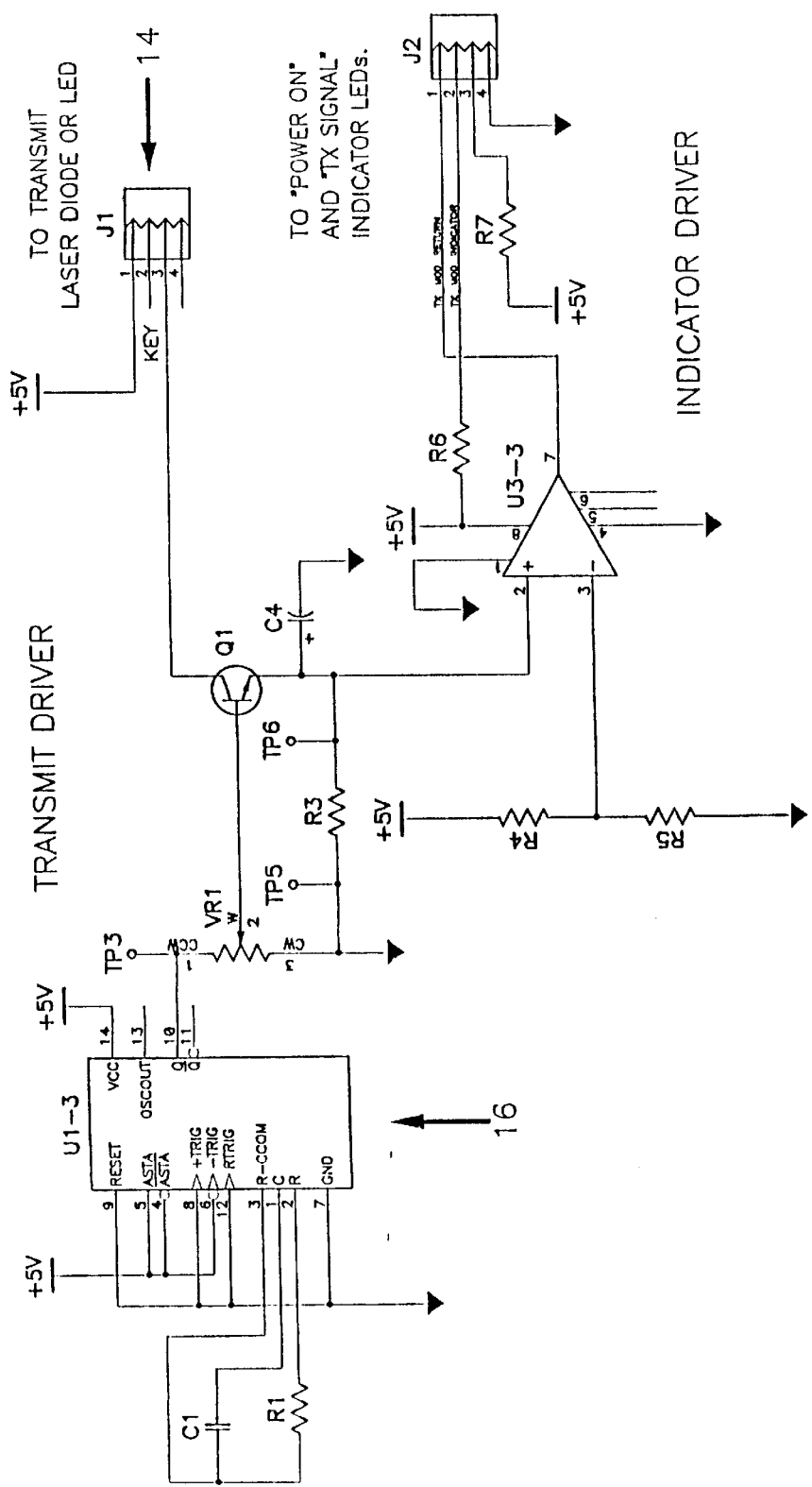
FIG. 3 is a schematic electrical diagram of the transmitter shown in FIG. 1

FIG. 3 is a schematic diagram that illustrates the transmitter driver 16 and indicator driver circuitry for the optical transmitter 13. The values of the components indicated in FIG. 3 are set forth in Table A at the end of this specification. To minimize the effect of any ambient light the transmitting diode 14 is modulated at a frequency which is generated by the transmitter driver 16. The modulation frequency should be higher than that of the scintillation signal. In normal conditions that exist within industrial smokestacks and chimneys the scintillation frequency is below a few hundred Hertz. Therefore a modulation frequency of about 10 kHz is appropriate.

As shown in FIG. 3, a waveform shaping circuit U1-3 in the transmitter driver 16 drives a transistor Q1 that in turn provides the driving signal to the laser diode or LED 14. The variable resistor VR1 adjusts the DC bias of transistor Q1. The transistor Q1 is a current driver rather than a voltage driver transistor. When transistor Q1 conducts, an operational amplifier U3-3 is activated to provide power and transmit signals to the transmitting laser diode or LED 14 and to indicator LEDs which are connected to junction plug J2.

Figure 4:
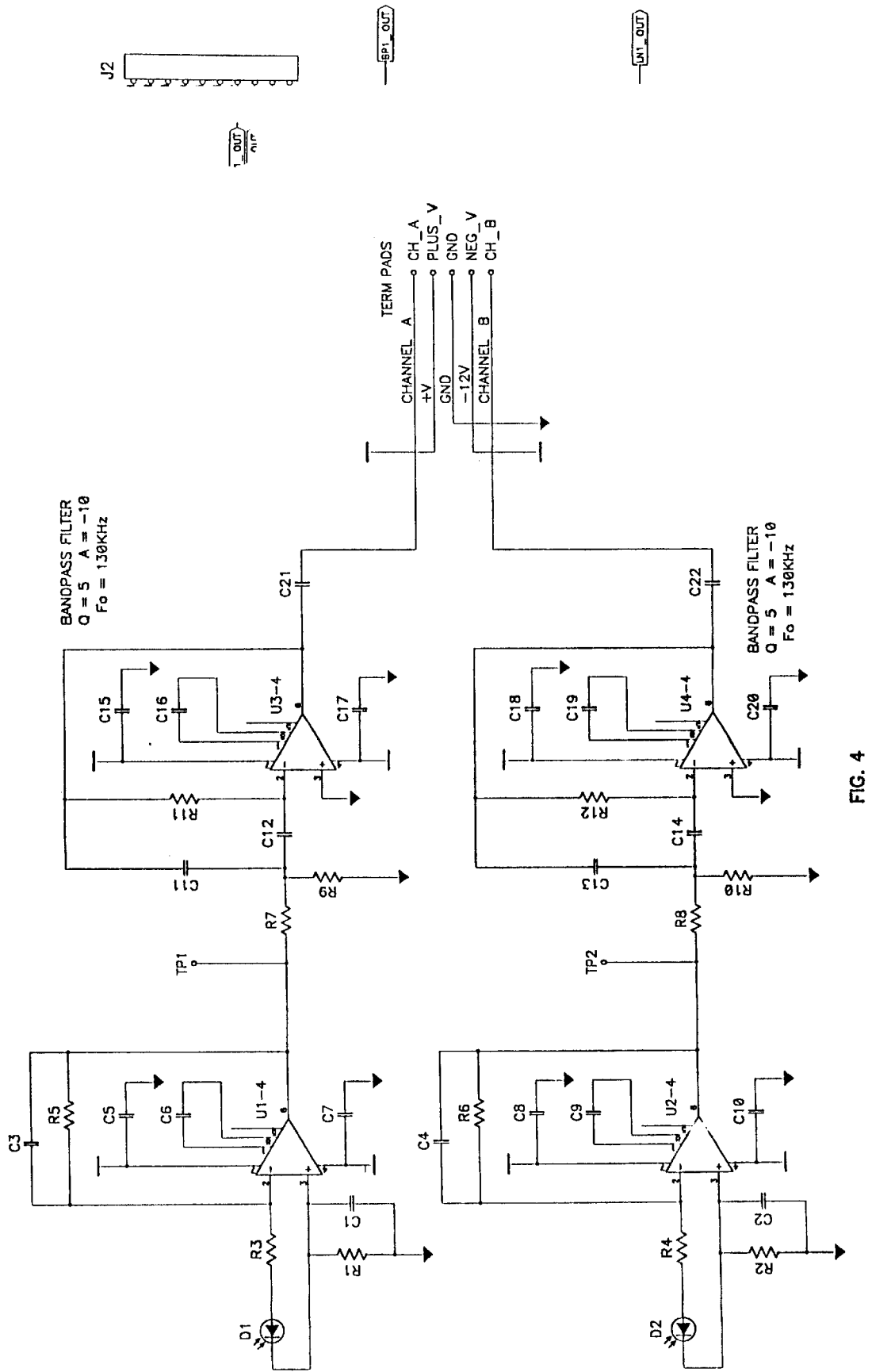
FIG. 4 is a schematic electrical diagram of the receiver and preamplifiers shown in FIG. 1.

The photodetectors D1 and D2 are respectively positioned at the focal points of receiving lenses 20 and 22. The two optical signals from the receiving lenses 20 and 22 are detected, respectively, by the two photodetectors D1 and D2 and converted to electronic signals. The received photodetector signals are amplified in the preamplifiers 30 and 32, which are illustrated schematically in FIG. 4. The circuit components shown in FIG. 4 are identified in Table B at the end of this specification. The operational amplifier U1-4 amplifies the signal from photodetector D1. Similarly, the operational amplifier U2-4 amplifies the signal from photodetector D2. The amplified photodetector output signals are then filtered, respectively, through band pass filters U3-4 and U4-4. Once the outputs of the photodetectors D1 and D2 have been preamplified and filtered, they are provided as outputs CHANNEL A and CHANNEL B, respectively.

Figure 5A:
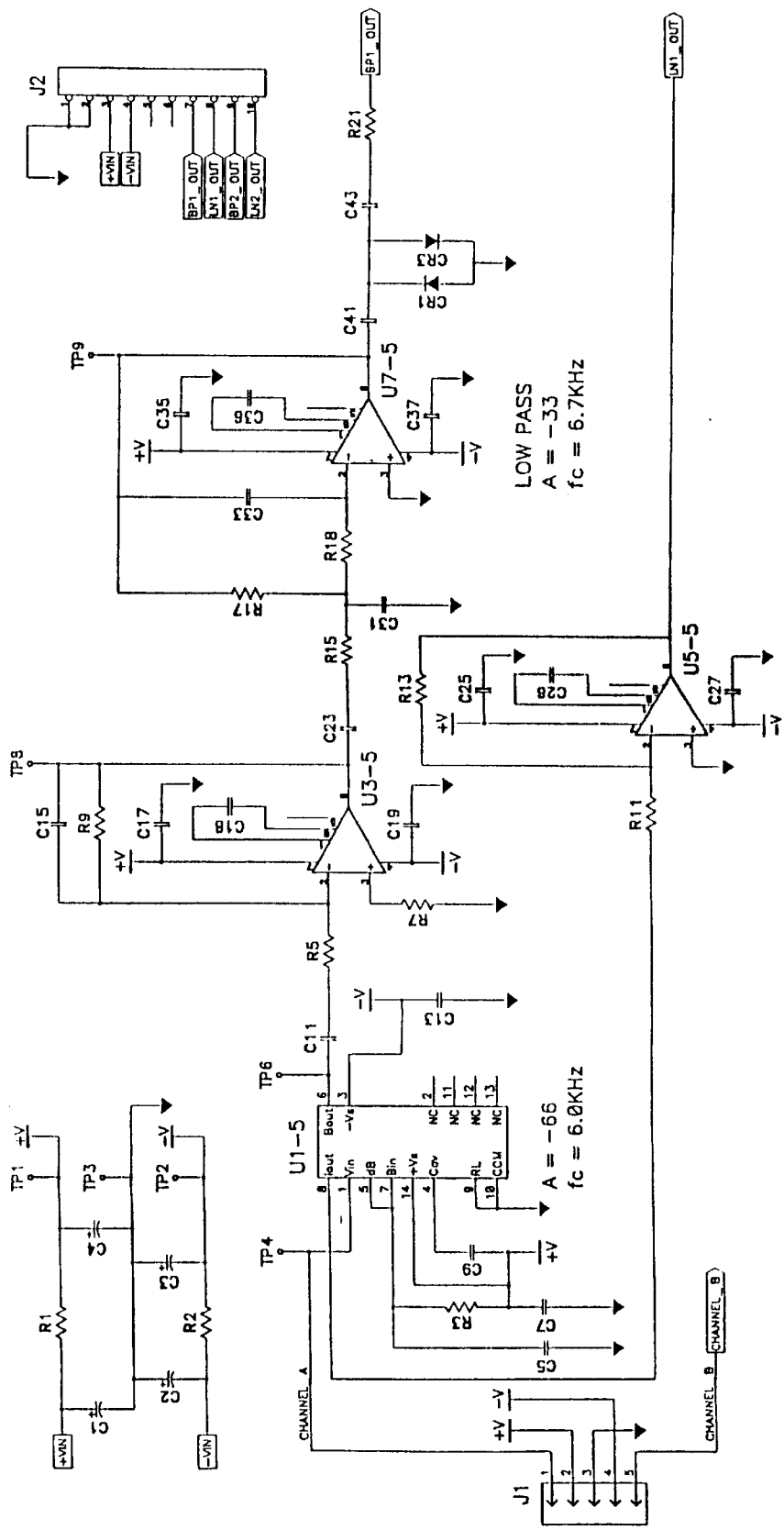
FIG. 5A is a schematic electrical diagram of a portion of the band pass filter, demodulator, low pass filter and analog-to-digital converting circuitry shown in FIG. 1.
Figure 5:
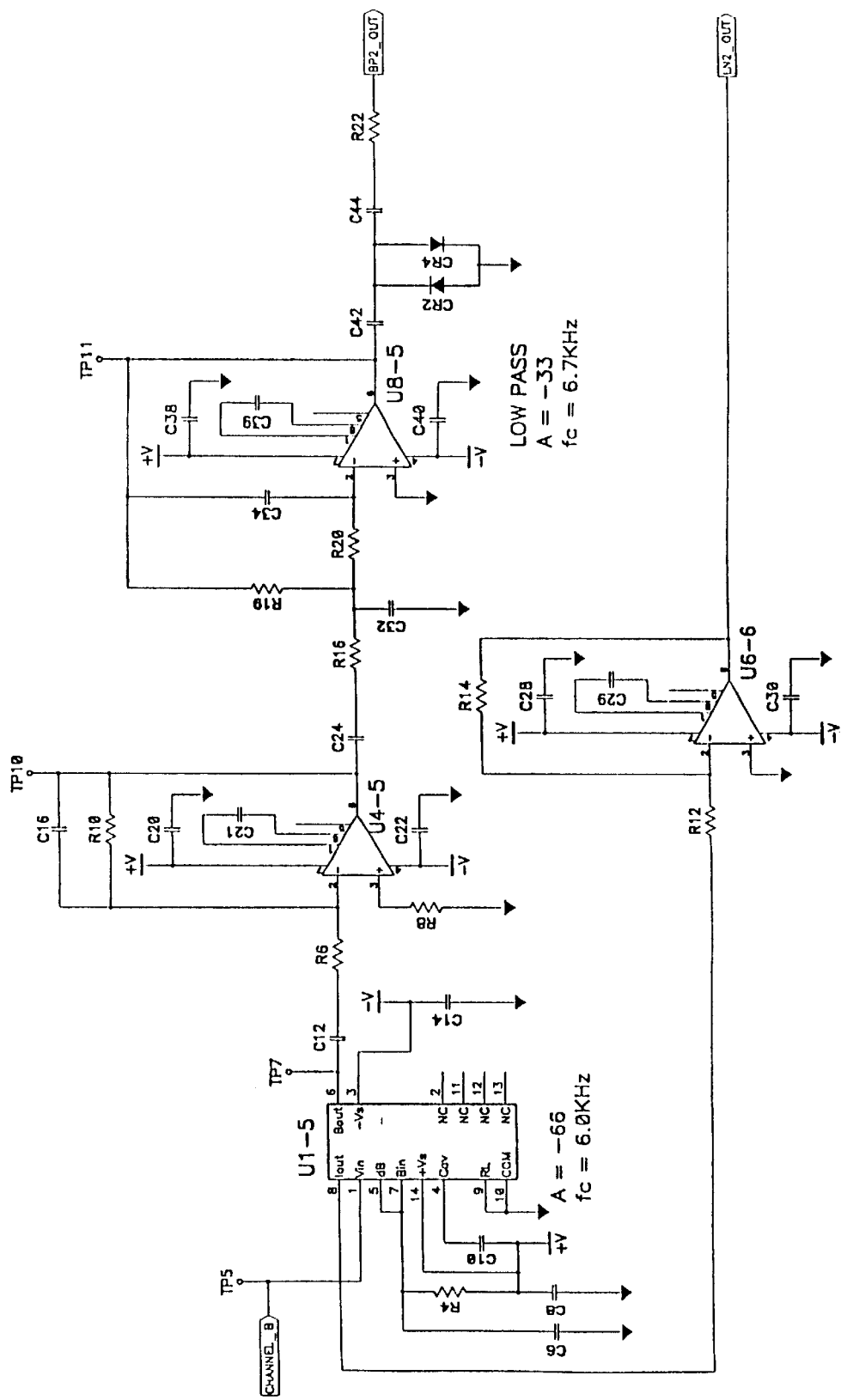
FIG. 5B is a schematic electrical diagram of the remaining portion of the band pass filter, demodulator, low pass filter and analog-to-digital converting circuitry shown in FIG. 1.

The outputs CHANNEL A and CHANNEL B are fed to separate demodulation circuits 38 and 40, illustrated schematically in FIGS. 5A and 5B, where they are separately demodulated by chips U1-5 and U2-5 and amplified by operational amplifiers U3-5 and U4-5, respectively. The demodulated and amplified signals are then respectively directed as inputs to operational amplifiers U7-5 and U8-5, which form the operative elements of low pass filter circuits. The filtered outputs appeared as signals BP1_OUT and BP2_OUT in FIGS. 5A and 5B, respectively.

The gain amplification circuits 29 and 31 also perform signal strength measurement concurrently with demodulation and low pass filtering of the photodetector outputs. The amplifiers U5-5 and U6-5 provide outputs which are proportional to signal strength from the photodetectors D1 and D2. The outputs LN1_OUT and LN2_OUT respectively indicate the signal strength from the photodetectors D1 and D2. If some unusual condition exists, for example a blockage of light, the magnitude of either or both of the threshold signals LN1_OUT or LN2_OUT will fall below some preestablished threshold. This condition is subsequently detected in the digital signal processor 50. When signal strength of photodetector outputs BP1_OUT and PB2_OUT are below the threshold set in the digital signal processor 50, the data signals BP1_OUT and BP2_OUT will be discarded.

The demodulated and filtered signals BP1_OUT and BP2_OUT from the photodetectors D1 and D2 are transmitted from the gain amplifier circuits 29 and 31 to analog-to-digital converters 46 and 48, shown in FIG. 1. The digitized form of the data signals BP1_OUT and BP2_OUT, together with the digitized form of the signal strength outputs LN1_OUT and LN2_OUT are collectively labeled S1 and S2, respectively in FIG. 1.

Figure 2:
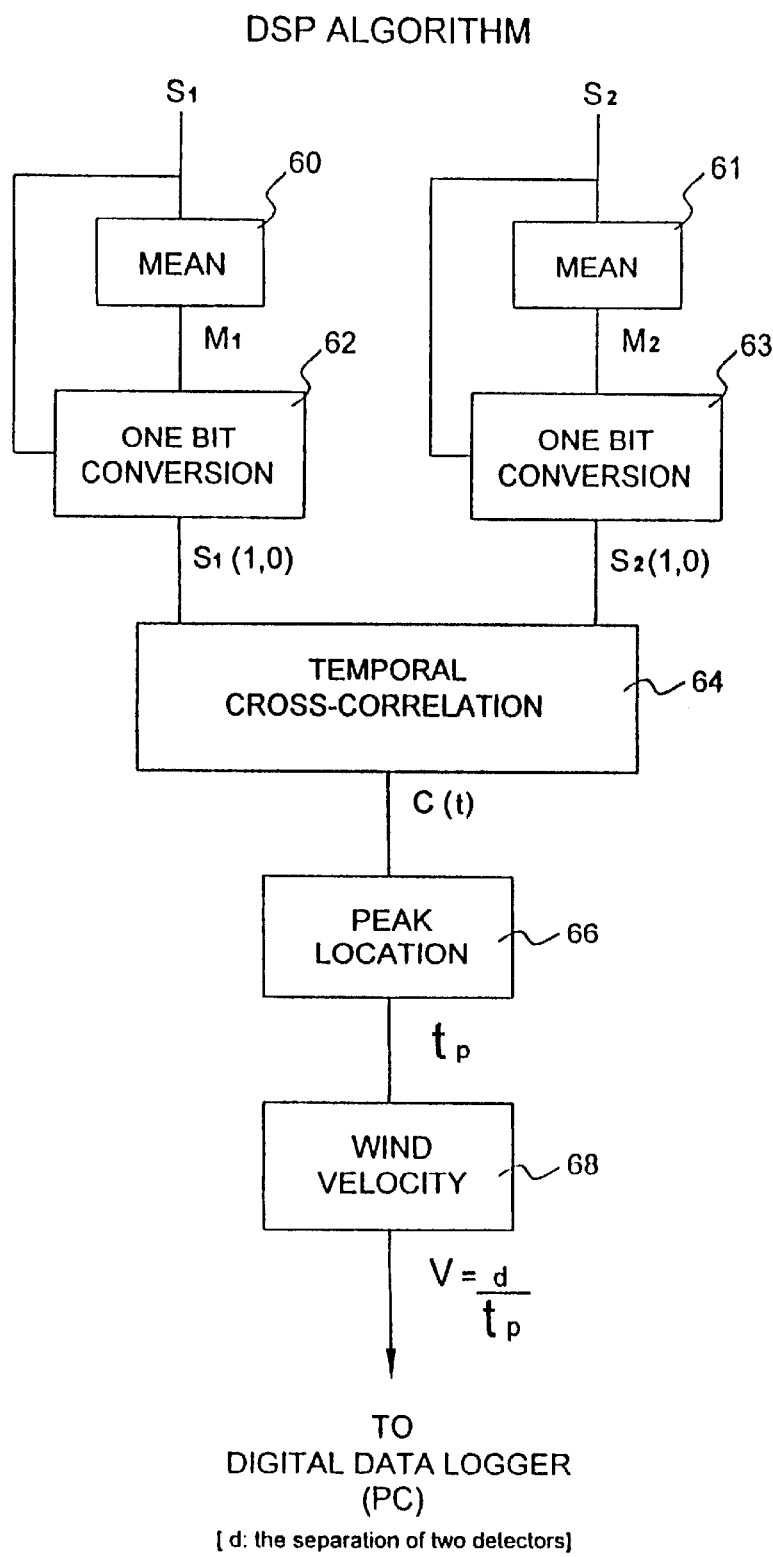
FIG. 2 is a flow diagram illustrating the steps performed by the digital signal processor.
Figure 6:
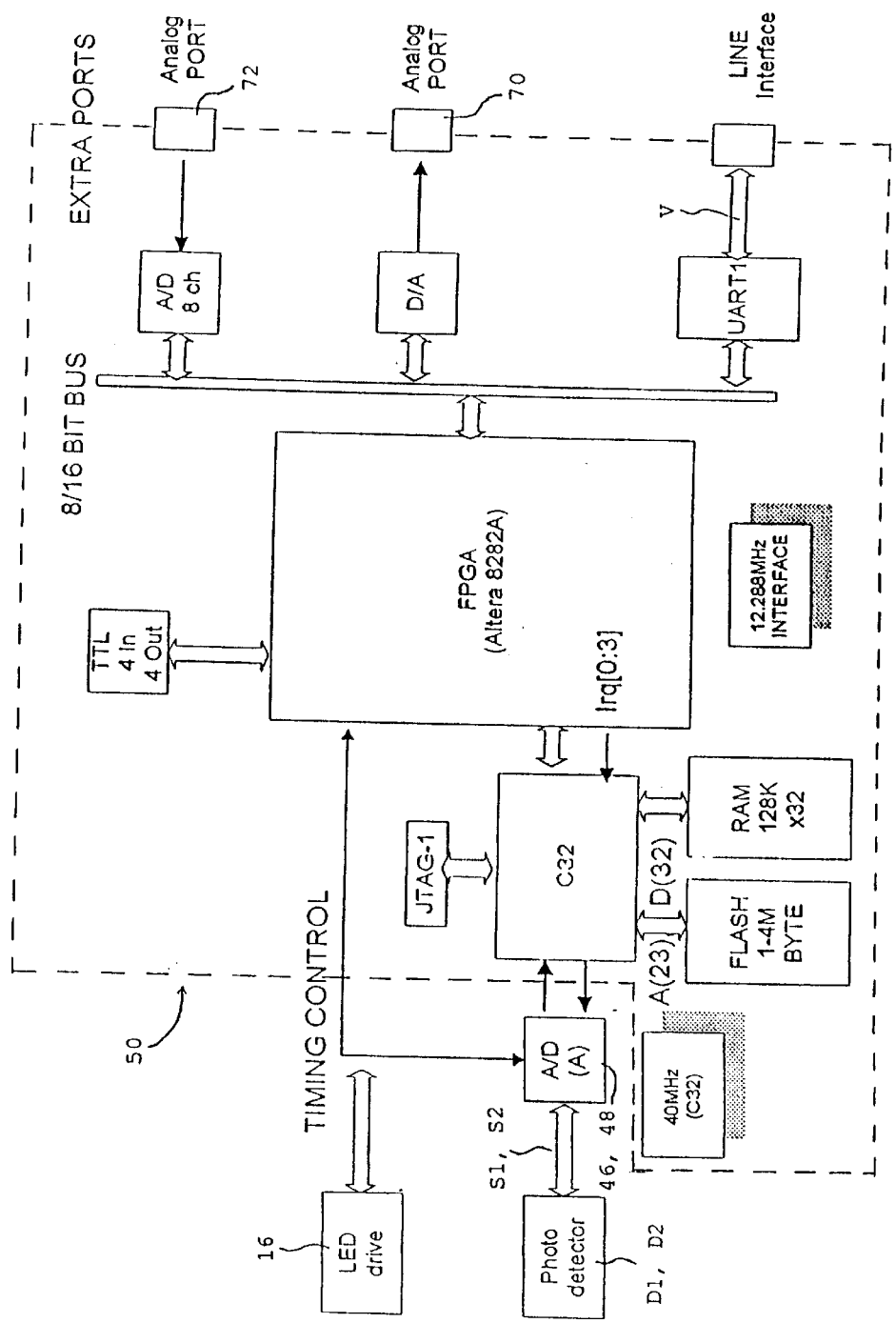
FIG. 6 is a block diagram showing the components of the digital signal processor shown in FIG. 1.

FIG. 2 illustrates the processing steps performed by the digital signal processor 50 in flow diagram form. The organizational structure of the digital signal processor 50 is illustrated in FIG. 6. FIG. 6 illustrates in block diagram form the components of the digital signal processor 50 that perform the steps that are shown in flow diagram form in FIG. 2.

At the heart of the digital signal processor 50 is a processing unit C32. The algorithm of FIG. 2 is implemented in a processor chip which is processor C32. The other chips illustrated in FIG. 6 support the operation of processor chip C32. Processor chip C32 may be a chip model TMS320C32 manufactured by Texas Instruments Inc. The chip FPGA is a field programable gate array that performs supporting functions for the processor C32 to enable it to perform the necessary digital calculations.

All of the components of the block diagram of FIG. 6 are commercially available electronic components available from a various integrated circuit manufacturers. The extra analog ports 70 and 72 provide analog outputs of the velocity signal V and the signal-to-noise ratio signal S/N for use by analog devices, such as pen recorders and other analog recording instruments.

With reference to FIG. 2 the first step performed is indicated at 60 and 61 with respect to the two digitized input signals S1 and S2, respectively. A time averaged mean output magnitude of the digitized data signals BP1_OUT and BP2_OUT of S1 and S2 from each of the photodetectors D1 and D2 is calculated in the processor chip C32. These mean average signals are indicated at M1 and M2. Each of the signals S1 and S2 is sampled at some discrete time interval, of perhaps 7–10 ksps and averaged over some much longer time interval, for example one second. The sample of signals used to determine the mean average signals M1 and M2 may represent about 10,000 samples each.

The data portion of each new signal S1 and S2 is then compared at steps 62 and 63, respectively, with the mean signals M1 and M2. If the data portions of the signals S1 and S2 are greater then their respective mean averages, they are assigned a one bit value of +1. If they are not greater then their respective mean averages, they are assigned a one bit value of 0. Each signal S1 and S2 is therefore converted to a one bit stream, either +1 or 0. This step is therefore a step of one bit conversion.

The continuous stream of signals S1 and S2 represents a running stream of binary signals, each of which is either +1 or 0. Step 64 in FIG. 2 represents the step of temporal cross correlation in which the bits streams S1(1,0) and S2(1,0) are compared with each other to find where matching scintillation events have been detected at different points in time.

The time differential output produced by step 64 is indicated at C(t) in FIG. 2.

Figure 7:
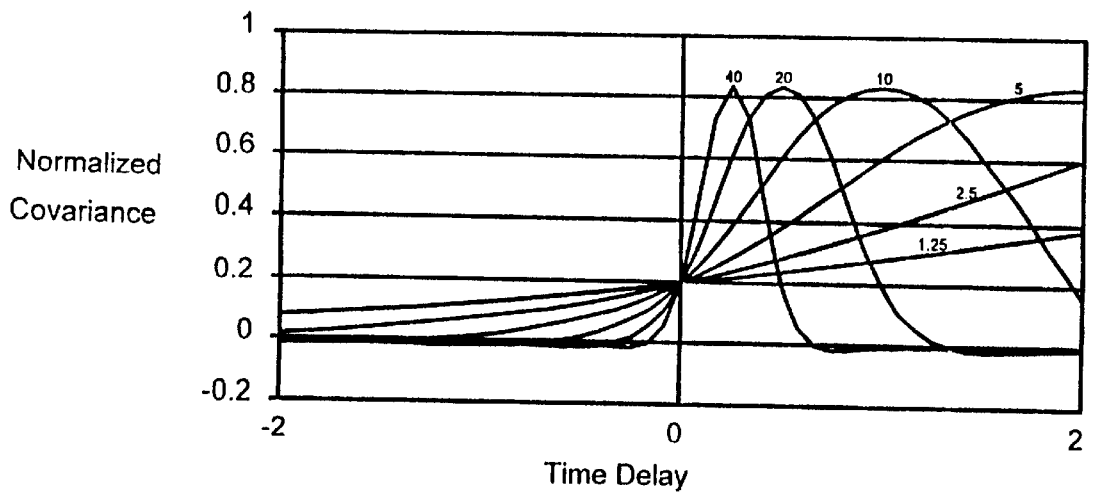
FIG. 7 illustrates typical normalized covariance curves for different crosswinds.

The optical source 14 with circular aperture $D_t$ illuminates the two adjacent photodetector receivers $D_1$ and $D_2$. The finite, circular apertures $D_t$ and $D_r$, represent the transmitting and receiving apertures respectively. The covariance function of log-amplitude scintillation of the two receiving signals $C_X(r,t) = <S(r+r_1,t+t_1)S(r_1,t_1)>$ is:

$$C_X(r,t) = 0.132\pi^2 k^2 \int_0^L dz\, C_n^2(z) \int_o^\infty dK\, K^{-8/3} \sin^2\left[\frac{K^2 z(L-z)}{2kL}\right] \times \quad (1)$$

$$J_0\left[K\left|r\frac{z}{L} - vt\right|\right] \left\{\frac{2J_1\left(\frac{KD_r z}{2L}\right)}{\frac{KD_r z}{2L}}\right\}^2 \left\{\frac{2J_1\left(\frac{KD_t}{2}\left(1-\frac{z}{L}\right)\right)}{\frac{KD_t}{2}\left(1-\frac{z}{L}\right)}\right\}^2,$$

where $J_0$ is the zero-order Bessel function of the first kind, r is the separation of the two detectors, and v is the crosswind. Incorporate the effects of wind, we use Taylor's hypothesis and replace r by |r−v t L/z|. Typical normalized covariance curves for different crosswind are shown in FIG. 7.

Figure 8:
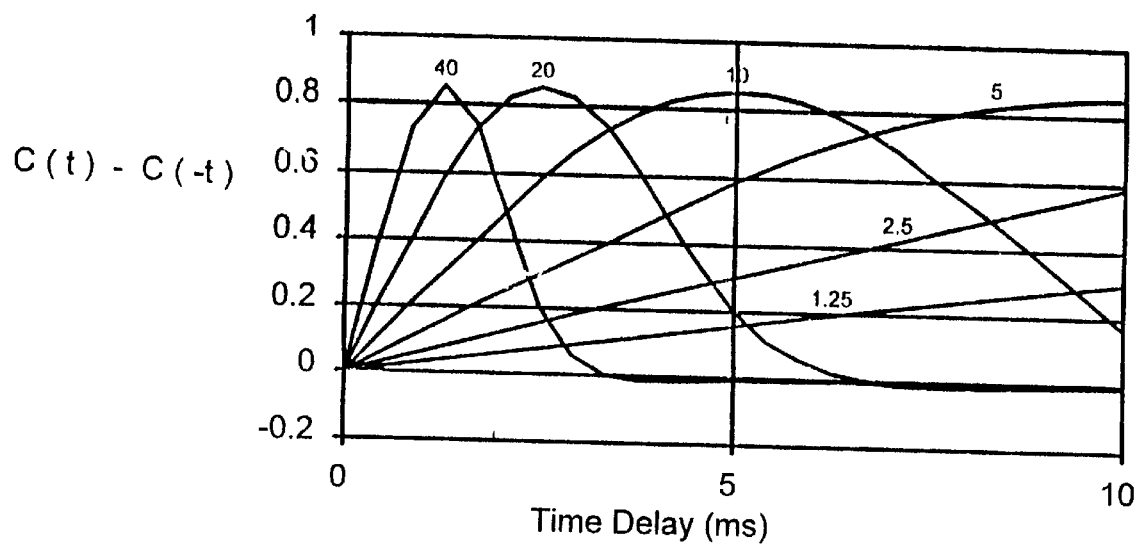
FIG. 8 illustrates typical differences of normalized covariance curves for different crosswinds.
Figure 9:
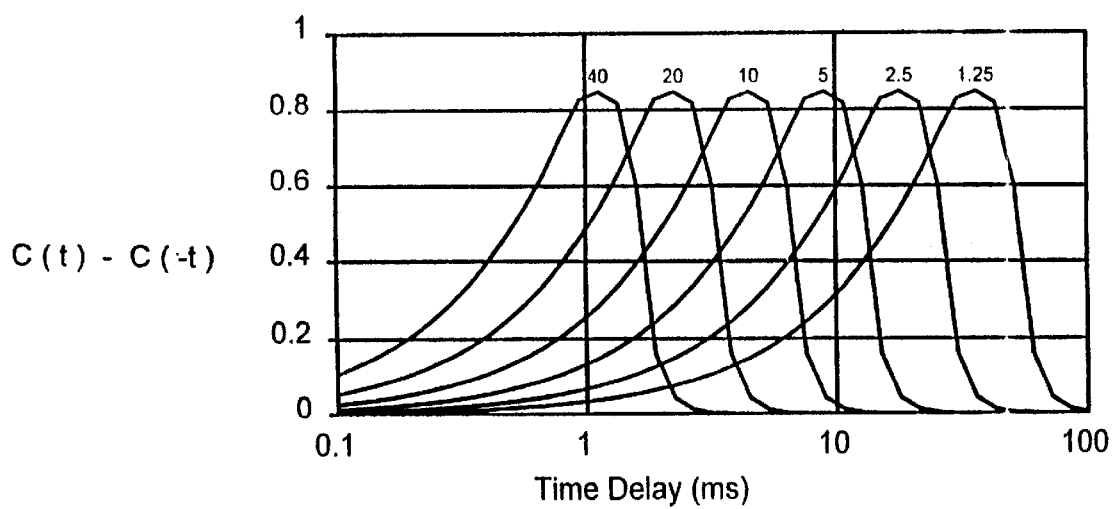
FIG. 9 illustrates the curves of FIG. 8 plotted on a logarithmic scale of time delay for different crosswinds.

By taking the difference of positive and negative time delays of the covariance function of the scintillation signals received from the two detectors, i.e., $C_d(t) = C_x(t) - C_x(-t)$, all the noises common to both detectors will be removed. The width of the difference covariance function $C_d(t)$ is inversely proportional to the path-averaged crosswind FIG. 8. However, the width of the difference covariance function $C_d[\log(t)]$ is independent of the path-averaged crosswind if $C_d[\log(t)]$ is plotted on a logarithmic scale of time delay FIG. 9. Only the position and the mean time delay of the difference covariance function $C_d[\log(t)]$ is inversely proportional to the crosswind. The amplitude of $C_d[\log(t)]$ will depend on the signal-to-noise ratio only and it is not a function of crosswind velocity. Therefore the amplitude or the area under the curve $C_d[\log(t)]$ can be used as a data quality factor to indicate the level of S/N. Larger amplitude or area indicates better S/N.

To obtain the crosswind, let $$y = \log_2 t; \quad (2)$$

then $$dy = \frac{dt}{t \ln 2}. \quad (3)$$

For a fixed receiver separation, the difference covariance function can be rewritten as $$C_d[\log(t)] = C(y). \quad (4)$$

The mean of y becomes $$\langle y \rangle = \frac{\int_{-\infty}^\infty C(y) y\, dy}{\int_{-\infty}^\infty C(y)\, dy}. \quad (5)$$

It is not difficult to find that the two integrals in Equation (5) can be expressed as:

$$\int_{-\infty}^\infty C(y)\, dy = \frac{1}{\ln 2} \int_0^\infty C(x_0 - x) \frac{dx}{x}; \text{ and} \quad (6)$$

$$\int_{-\infty}^\infty C(y) y\, dy = \frac{1}{\ln 2}\left[\int_0^\infty C(x_0 - x)\log_2 x \frac{dx}{x} - \int_0^\infty C(x_0 - x)\log_2 v \frac{dx}{x}\right], \quad (7)$$

where x=vt and $x_0$ is the separation of the two receivers. Substituting Equations (6) and (7) into Equation (5) gives:

$$\langle y \rangle = -\log_2 v + \frac{\int_0^\infty C(x_0 - x)\log_2 x \frac{dx}{x}}{\int_0^\infty C(x_0 - x) \frac{dx}{x}}. \quad (8)$$

Let $$y_0 = \frac{\int_0^\infty C(x_0 - x)\log_2 x \frac{dx}{x}}{\int_0^\infty C(x_0 - x) \frac{dx}{x}}; \quad (9)$$

Equation (8) becomes:

$$v = 2^{-\langle y \rangle + y_0} = k_0 2^{-\langle y \rangle}, \quad (10)$$

where $y_0$ and $k_0$ are constants. From Equations (1) and (9), it can be shown that $y_0$ and $k_0$ are independent of pathlength L if $D_r$ and $D_t >> (\lambda L)^{1/2}$. They are only dependent on the separation $x_0$ of the two receivers and the receiver and transmitter size $D_r$ and $D_t$. From Equation (10) the mean crosswind can be calculated.

Retrieving of the Temporal Cross Correlation

For two signals $S_1(t)$ and $S_2(t)$, the temporal cross correlation can be defined as:

$$C_0 = \langle S_1(t) S_2(t) \rangle \quad (11)$$

$$C_1 = \langle S_1(t) S_2(t + \Delta t) \rangle$$

$$\vdots$$

$$C_N = \langle S_1(t) S_2(t + N\Delta t) \rangle,$$

where $\Delta t$ is the sampling period of the data string, and $<S_1 S_2>$ indicates an ensemble average. One major challenge of calculating cross correlation via Equation (11) with N time delays is that a number of calculations proportional to $N^2$ has heretofore been required. The presently commercially available two-channel digital-signal-processors (DSP), such as the model TMS320C32, are not fast enough to process the crosswind retrieval algorithm in this brutal force approach when N is large. To speed up the calculation of the cross-covariance function, a Fast Correlation Algorithm (FCA) similar to that of the Fast Fourier Transform (FFT) has been developed according to the present invention as follows.

For any data string with N ($=2^n$) data points, by averaging the two adjacent points to form a new string with length N/2. It can be shown that the correlation $C'_2$ of the two-point averaged data is:

$$C'_2 = \left\langle \frac{[S_1(t) + S_1(t + \Delta t)]}{2} \frac{[S_2(t + 2\Delta t) + S_2(t + 3\Delta t)]}{2} \right\rangle \quad (12)$$

-continued $$= \frac{1}{4}(C_1 + 2C_2 + C_3).$$

Averaging the two adjacent points of this string once again to form another string with length N/4 gives:

$$C'_4 = \left\{ \frac{[S_1(t) + S_1(t + \Delta t) + S_1(t + 2\Delta t) + S_1(t + 3\Delta t)]}{4} \times \right.$$
$$\left. \frac{[S_2(t + 4\Delta t) + S_1(t + 5\Delta t) + S_1(t + 6\Delta t) + S_2(t + 7\Delta t)]}{4} \right\} \quad (13)$$

$$= \frac{1}{16}(C_1 + 2C_2 + 3C_3 + 4C_4 + 3C_5 + 2C_6 + C_7).$$

Iteratively doing this process n (=$\log_2 N$) times gives:

$$C'_N = \left\{ \frac{[S_1(t) + S_1(t + \Delta t) + \ldots + S_1(t + (N-1)\Delta t)]}{N} \times \right.$$
$$\left. \frac{[S_2(t + N\Delta t) + S_2(t + (N+1)\Delta t) + \ldots + S_2(t + (2N-1)\Delta t)]}{N} \right\} \quad (14)$$

$$= \frac{1}{N^2}(C_1 + 2C_2 + \ldots + NC_N + (N-1)C_{N+1} + \ldots + C_{2N-1}).$$

Equations (12) to (14) represent the cross correlation $C'_N$ of the data string that is the average of the two adjacent data points of the previous data string. A total of n strings formed each with the data length of N, N/2, N/4 . . . 4, 2, respectively. Equation (14) also indicates that the cross correlation $C'_N$ is a weighted average of the original cross correlation from $C_1$ to $C_{2N-1}$. To isolate $C'_N$ from $C_1$ to $C_{N/2}$, a new cross correlation $C''_N$ can be defined as:

$$C''_N = \frac{4}{3}\left(C'_N - \frac{1}{4}C'_{N/2}\right) \quad (15)$$

$$= \frac{4}{3N^2}[2C_{N/2+1} + 4C_{N/2+2} + \ldots + NC_N + (N-1)C_{N+1} + \ldots + C_{2N-1}]$$

It is clear that $C''_N$ is independent of any cross correlation from $C_1$ to $C_{N/2}$.

Extensive computer simulation shows that a one-bit correlation technique is adequate for data processing to retrieve the crosswind from the two detected signals. Two random data strings with known cross correlation have been generated by computer. The data have been assigned to either +1 or −1 (one-bit) to calculate the temporal cross correlation. The crosswind can then be calculated from the resulting temporal cross correlation. The computer simulated results indicate that the crosswind can be reliably retrieved with one-bit correlation scheme.

The major advantage of the Fast Correlation Algorithm (FCA) used in the present invention is that the total number of calculations is proportional to 2N instead of $N^2$. This represents a reduction by a factor of N/2 in the number of calculations necessary for crosswind retrieval. This crucial reduction of calculations especially for large N substantially reduces the processing time taken to retrieve the crosswind. The value of C(t) in FIG. 2 is calculated according to Equation (15), hereinbefore set forth.

The next step performed is the step of peak location, indicated as step 66 in FIG. 2. The peak location step 66 involves analyzing the cross correlation C(t) of single bit codes S1(1,0) and S2(1,0) to determine peaks in the output signals C(t) from photodetectors D1 and D2 to thereby ascertain the time of detection of identifiable scintillation events by each of the photodetectors D1 and D2. The signal C(t) is shaped more or less like a bell shaped curve. The signal $t_p$ is the time delay at the peak of C(t). The signal $t_p$ therefore represents the time delay between a scintillation detected by photodetector D1 and the same scintillation detected by photodetector D2.

Step 68 represents the arithmetic calculation performed to determine the wind velocity, that is, the rate of airflow in the direction 10 in chimney 12. Since the distance of separation r between the two photodetectors D1 and D2 is known, it is a simple matter to calculate the wind velocity V by dividing r by $t_p$.

Computer Simulation Results for Noisy Signal Retrieval

In order to retrieve the crosswind under extremely noisy condition, a data processing algorithm of the invention uses 1024 time delays of the whole covariance curve. The use of the whole curve instead of using only a few point of the covariance function gives much better rejection on random noise. Computer simulation has also demonstrated that a data processing algorithm using 1024 time delays of the whole covariance function curve is implementable for the commercially available two-channel digital-signal-processor (DSP) speed and memory size, such as the preferred embodiment of the digital signal processor 50 employed. It has been demonstrated that crosswind can be satisfactorily retrieved under extremely noisy conditions. Even for signal-to-noise ratios as low as −40 db ($10^{-4}$). Under such conditions in which signal energy is only one part in ten thousand of the noise energy, the crosswind is still reliably retrieved.

Extensive computer simulations have been performed to test the system linearity, signal-to-noise ratio sensitivity, and dynamic range of the present algorithm to retrieve the crosswind. The use of 1024 time delays of the covariance function curve substantially suppresses the effect of random noise. It has been demonstrated that crosswind could be satisfactorily retrieved under extremely noisy conditions. Even for signal-to-noise ratios as low as −40 db ($10^{-4}$), i.e., signal energy is only one part in ten thousand of the noise energy, it is still possible to reliably retrieve the crosswind. Computer simulation results indicated that time delay range of covariance function from 0.07 to 71.7 ms is required to retrieve crosswind speed from 70 m/s to 0.07 m/s respectively. The algorithm of the present invention gives a system crosswind measurable range from 0.07 to 70 m/s.

The application of the system of the invention is not limited to the measurement of gas flow rates through relatively narrow channels. Indeed, the same techniques may be employed to measure gas flow through very wide areas. For example, by modifying the size of the photodetectors, essentially the same system depicted and described in the drawings may be utilized to measure cross wind at airport runways. The same techniques may also be employed to measure liquid flow through transparent tubes for chemical or pharmaceutical process control. Numerous other applications are also possible.

Undoubtedly, numerous variations and modifications of the circuit and optical components of the invention will become readily apparent to those familiar with optical sensing systems. A number of different processor chips may be used as substitutes for the Texas Instrument chip TMS320C32 as the processor chip C32 and several different chips can be used as the FPGA chip in place of the Altera 8282A chip illustrated. Accordingly, the scope of the invention should not be construed as limited to the specific embodiment or implementation of the method depicted and described, but rather as defined in the claims appended hereto.

TABLE A

| DESCRIPTION | DWG. REFERENCE |
|---|---|
| CAP, MONOLITHIC CERAMIC, RADIAL, 50 V, 680 pF, 5% COG, 0.2 LS | C1 |
| CAP, ELECTROLYTIC, RADIAL, 25 V, 470 UF, 0.2 LS | C2, C3, C4 |
| FUSE, 3 AG, SLO-BLO, 1.00 A/250 V | F1 |
| HDWR, FUSE, CLIP w/END STOP, PCB MT, f/3 AG | F1 |
| CONN, HEADER STICK, .025 SQ/.230 L POST, 2 × 36, GOLD | J1, J2 |
| MODULE, POWER SUPPLY, ENCAPSULATED PCB MT, UNIVERSAL IN, +/−12 V/10 W OUT | PS1 |
| SEMIC, TRANSISTOR, BIPOLAR, NPN, TO-92 | Q1 |
| RES, METAL FILM, RN55, ¼ W, 1.54K, 1% | R1 |

TABLE A-continued

| DESCRIPTION | DWG. REFERENCE |
|---|---|
| RES, METAL FILM, RL32, 2 W, 10 Ohm, 5% | R2, R3 |
| RES, METAL FILM, RN55, ¼ W, 4.99K, 1% | R4 |
| RES, METAL FILM, RN55, ¼ W, 51.1 Ohm, 1% | R5 |
| RES, METAL FILM, RN55, ¼ W, 150 Ohm, 1% | R6, R7 |
| CONN, TERM. BLOCK, PCB MT., MODULAR, 3 POS., 0.2 IN./5 mm L.S | TB1 |
| CONN, HEADER STICK, .025 SQ/.230 L POST, 1 × 36, GOLD | TP1, TP2, TP3, TP4, TP5, TP6 |
| IC, CMOS, MONOSTABLE MULTIVIBRATOR, 14 DIP | U1-3 |
| IC, VOLTAGE REGULATOR, −12 Vin, −5 Vo, TO-220 | U2 |
| IC, COMPARATOR LINEAR LT1011CN8 | U3-3 |
| SEMIC, TRANS. SUPP. TRANZORB | V1, V2, V3 |
| RES, TRIMPOT, ⅜ SQ., ½ W, 1K, 10%, TOP ADJ, 19 TURN | VR1 |
| MISC, PC BOARD, OFS TRANSMITTER | PCB |

TABLE B

| DESCRIPTION | DWG. REFERENCE |
|---|---|
| CAP, MONOLITHIC CERAMIC, RADIAL, 50 V, 5 PF, 5% COG, 0.1 LS | C3, C4 |
| CAP, MONOLITHIC CERAMIC, RADIAL, 50 V, 15 PF, 5% COG, 0.1 LS | C6, C9, C16, C19 |
| CAP, MONOLITHIC CERAMIC, RADIAL, 50 V, 150 PF, 5% COG, 0.1 LS | C11, C12, C13, C14 |
| CAP, POLY FILM, RADIAL, 50 V, 0.1 UF, 5%, 0.2 LS, STACKED | C5, C7, C8, C10, C15, C17, C18, C20, C21, C22 |
| CAP, MONOLITHIC CERAMIC, RADIAL, 50 V, — 5% COG, 0.1 LS (VALUE T.B.D.) | C1, C2 |
| CONN, HEADER STICK, .025 SQ/.230 L POST, 1 × 36, GOLD | TP1 |
| CONN, HEADER STICK, .025 SQ/.230 L POST, 2 × 36, GOLD | J1 |
| IC, OP AMP, HIGH SPEED, DIP8 NATIONAL LM318 | U1-4, U2-4, U3-4, U4-4 |
| RES, METAL FILM, RN55, ¼ W, 100K, 1% | R11, R12 |
| RES, METAL FILM, RN55, ¼ W, 1.21K, 1% | R9, R10 |
| RES, METAL FILM, RN55, ¼ W, 4.99K, 1% | R7, R8 |
| RES, METAL FILM, RN55, ¼ W, 221K, 1% | R1, R2, R5, R6 |
| RES, OTHER, RL07, ¼ W, 0.0, 1%, ZERO-OHM | R3, R4 |
| SEMIC, PHOTODIODE, PIN SILICON, 10 DEG. ACCEPTANCE ANGLE, CONVEX LENS | D1, D2 |
| HDWR, OTHER, MOUNTING SPACER, TO5/.2 SPACING, NYLON | D1, D2 |
| MISC, PC BOARD, OFS RECEIVER PREAMP | PCB |

TABLE C

| DESCRIPTION | DWG. REFERENCE |
|---|---|
| CAP, ELECTROLYTIC, RADIAL, 25 V, 470 UF, 0.2 LS | C1, C2, C3, C4 |
| CAP, POLY FILM, RADIAL, 50 V, 0.1 UF, 5%, 0.2 LS, STACKED | C5, C6, C7, C8, C13, C14, C17 C19, C20, C22, C28, C30, C35, C37, C38, C40, C45, C46 |
| CAP, MONOLITHIC CERAMIC, RADIAL, 50 V, 330 PF, 5% COG, 0.1 LS | C9, C10, C15, C16, C33, C34 |
| CAP, MONOLITHIC CERAMIC, RADIAL, 50 V, 1.0 UF, 10% | C11, C12, C23, C24 |
| CAP, MONOLITHIC CERAMIC, RADIAL, 200 V, 47 PF, 5% 0.1 LS | C18, C21, C26, C29, C36, C39 |
| CAP, POLY FILM, RADIAL, 50 V, 0.022 UF, 5%, 0.2 LS, STACKED | C31, C32 |
| CAP, MONOLITHIC CERAMIC, RADIAL, 50 V, 1.0 UF, 10% | C41, C42, C43, C44 |
| SEMIC, DIODE, HIGH SPEED RECT., 100 PIV, DO-35 | CR1, CR2, CR3, CR4 |
| CONN, HEADER STICK, .025 SQ/.230 L POST, 2 × 36, GOLD | J1 |
| CONN, HEADER STICK, .025 SQ/.230 L POST, 2 × 36, GOLD | J2, J3 |
| RES, POWER, METAL OXIDE, 1 Ohm, 1 W, 1% | R1, R2 |
| RES, METAL FILM, RN55, ¼ W, 1 M, 1% | R3, R4 |
| RES, METAL FILM, RN55, ¼ W, 1.5K, 1% | R5, R6, R18, R20 |
| RES, OTHER, RL07, ¼ W, 0.0, 1%, ZERO-OHM | R7, R8 |
| RES, METAL FILM, RN55, ¼ W, 100K, 1% | R9, R10 |

TABLE C-continued

| DESCRIPTION | DWG. REFERENCE |
| --- | --- |
| RES, METAL FILM, RN55, ¼ W, 10.0K, 1% | R11, R12, R13, R14 |
| RES, METAL FILM, RN55, ¼ W, 1.54K, 1% | R15, R16 |
| RES, METAL FILM, RN55, ¼ W, 51.1K, 1% | R17, R19 |
| RES, METAL FILM, RN55, ¼ W, 511 Ohm, 1% | R21, R22 |
| RES, METAL FILM, RN55, ¼ W, 4.99K, 1% | R23 |
| RES, METAL FILM, RN55, ¼ W, 51.1 Ohm, 1% | R30 |
| CONN, HEADER STICK, .025 SQ/.230 L POST, 1 × 36, GOLD | TP1, TP2, TP3, TP4, TP5, TP6, TP7, TP8, TP9, TP10, TP11 |
| IR, TRUE RMS-DC CONV, DIP14 | U2-5, U1-5 |
| IC, OP AMP, HIGH SPEED, DIP8 | U3-5, U4-5, U5-5, U6-5, U7-5, U8-5 |
| MISC, PC BOARD, OFS RECEIVER AMPLIFIER | PCB |

I claim:

1. An optical flow sensor for measuring gas flow velocity in a predetermined direction of gas flow comprising:

an optical transmitter that generates a collimated optical beam across said gas flow;

an optical receiver including a plurality of receiving lenses all located in optical communication with said optical transmitter and in the path of said optical beam and separated from each other in a direction parallel to said predetermined direction of gas flow, a separate optical photodetector for each of said receiving lenses that produces an electronic output that varies in response to scintillations occurring in said optical beam, a separate signal-controlled gain amplifier circuit coupled to each of said optical photodetectors;

a separate analog-to-digital converter coupled to each of said gain amplifier circuits for separately digitizing outputs from each of said gain amplifier circuits; and a digital signal processor coupled to receive inputs from all of said gain amplifier circuits to determine the temporal cross correlation of said digitized outputs for scintillation events detected separately by all of said photodetectors using a logarithmic time delay function based upon an original data string with $N=2^n$ data points by averaging successive data points in pairs to form a new data string having a length half that of said original data string and averaging each two adjacent points of said new data string to form another data string having a length half that of said new data string and iteratively averaging adjacent data points $n=\log_2 N$ times to provide therefrom a path integrated flow rate in said predetermined direction of gas flow.

2. An optical flow sensor according to claim 1 wherein said digital signal processor further includes a mean average calculation means for determining separately the mean average of said digitized outputs from each of said gain amplifier circuits to provide a separate time averaged mean therefrom, and a comparator means coupled to receive said digitized outputs from each gain amplifier circuit and from said mean average calculation means to provide separate streams of one-bit digital outputs indicative of comparison of said digitized outputs from said gain amplifiers with said mean averages thereof.

3. An optical flow sensor according to claim 2 further characterized in that said mean average calculation means includes sampling means for sampling said digitized outputs from said gain amplifier circuits at a rate of between about seven and about twenty kilohertz over an averaging period of about one second.

4. An optical flow sensor according to claim 2 wherein said digital processor further utilizes a one bit correlation technique to retrieve crosswind from said electronic outputs of said separate optical photodetectors.

5. An optical flow sensor according to claim 1 wherein said transmitter further comprises a waveform shaping modulator, and each of said gain amplifier circuits includes a preamplifier coupled to receive said electronic outputs from a single one of said photodetectors, a demodulation circuit coupled to receive an output from a single one of said preamplifiers, and a low pass filter coupled to receive an output from a single one of said demodulation circuits and connected to provide an input to a single one of said analog-to-digital converters.

6. An optical flow sensor according to claim 5 wherein said optical receiver is comprised of only a pair of said receiving lenses, and photodetectors and said digital signal processor has only two channels.

7. An optical flow sensor according to claim 1 wherein said transmitter includes a single laser diode.

8. An optical flow sensor according to claim 1 wherein said transmitter includes a single light emitting diode.

9. An optical flow sensor for measuring velocity of gas flow in a predetermined gas flow direction comprising:

a transmitter that includes an optical source and beam-forming optics for producing a collimated beam across said gas flow, a receiver located in a line-of-sight path with said optical beam and including a plural number of focusing receiving lenses spaced apart from each other in a direction parallel to said predetermined gas flow direction, and a separate photodetector for each of said receiving lenses which produce electronic outputs that vary with scintillation events occurring in said line-of-sight path, separate signal-controlled gain amplifiers for each of said photodetectors, separate analog-to-digital converters coupled to each of said gain amplifiers for converting said outputs therefrom from analog to digital signals, and a digital signal processor for cross correlating said digitized signals from said photodetectors as a function of time delay between the detection of scintillation events based upon a number of time delays=N using a fast correlation algorithm in which the total number of calculations of cross correlation data points is proportional to 2N to produce a signal indicative of velocity of gas flow in said predetermined gas flow direction.

10. An optical flow sensor according to claim 9 wherein said beam-forming optics include a transmitting lens that emits a collimated beam and said beam is aligned perpendicular to said predetermined gas flow direction.

11. An optical flow sensor according to claim 9 wherein said transmitter includes a single laser diode and said beam-forming optics include a single transmitting lens focused on said laser diode, and said receiver includes only two of said photodectors and only two of said receiving lenses, each of which is focused on a separate one of said two photodetectors, and said digital signal processor has only two channels.

12. An optical flow sensor according to claim 9 wherein said transmitter includes a single light emitting diode and said beam-forming optics include a single transmitting lens focused on said light emitting diode, and said receiver includes only two of said photodetectors and only two of said receiving lenses, each of which is focused on a separate one of said only two of said photodetectors.

13. A method of measuring velocity of gas flow in a predetermined linear direction comprising:

transmitting a collimated optical beam across a volume of gas along an optical line-of-sight path intersecting said predetermined linear direction of gas flow and crossing said gas flow, receiving said transmitted optical beam with a plurality of receiving scintillation detectors spatially separated from each other in a direction parallel to said predetermined linear direction, generating separate output signals from each of said receiving scintillation detectors in response to scintillations occurring in said gas flow, separately amplifying and digitizing each of said output signals, determining the temporal cross correlation of said separate output signals by using a logarithmic time delay function based upon an original data string with $N=2^n$ data points by averaging successive data points in pairs to form a new data string having a length half that of said original data string and averaging each two adjacent points of said new data string to form another data string having a length half that of said new data string, and iteratively averaging adjacent data points $n=\log_2 N$ times, and providing a velocity output signal indicative of velocity of gas flow in said predetermined linear direction based upon distance of separation of said receiving scintillation detectors from each other and upon said temporal cross correlation of said separate output signals.

14. A method according to claim 13 further comprising: calculating a time averaged mean output magnitude of signals from each of said photodetectors, repetitiously comparing said time averaged mean output magnitude with signal magnitude from each of said photodetectors, and generating a series of single bit codes for signals of each photodetector depending upon signal magnitude relative to said time averaged mean output magnitude, and utilizing said series of single bit codes for each of said photodetectors in said step of determining temporal cross correlation of said separate output signals.

15. A method according to claim 14 further comprising analyzing said series of single bit codes from each of said photodetectors to determine peaks in said output signals from each of said photodetectors to thereby ascertain the time of detection of identifiable scintillation events by each of said photodetectors.

16. A method according to claim 13 further comprising calculating signal-to-noise ratio for said output signals of said photodetectors as a data quality check.

17. A method of measuring velocity of gas flow in a predetermined linear direction comprising:

transmitting a collimated optical beam across a volume of gas along an optical line-of-sight path intersecting said predetermined linear direction of gas flow and crossing said gas flow, receiving said transmitted optical beam with a plurality of receiving scintillation detectors spatially separated from each other in a direction parallel to said predetermined linear direction, generating separate output signals from each of said receiving scintillation detectors in response to scintillations occurring in said gas flow, separately amplifying and digitizing each of said output signals, determining the temporal cross correlation of said separate output signals based upon a number of time delays=N using a fast correlation algorithm in which the total number of calculations of cross correlation data points is proportional to 2N, and providing a velocity output signal indicative of velocity of gas flow in said predetermined linear direction based upon distance of separation of said receiving scintillation detectors from each other and upon said temporal cross correlation of said separate output signals.

\* \* \* \* \*